United States Patent [19]

Heilman

[11] Patent Number: 5,033,633
[45] Date of Patent: Jul. 23, 1991

[54] PLASTIC CLOSURE WITH SAFETY BUTTON AND METHOD OF FORMING SAME

[75] Inventor: Robert J. Heilman, Orland Park, Ill.

[73] Assignee: Continental White Cap, Inc., Norwalk, Conn.

[21] Appl. No.: 464,418

[22] Filed: Jan. 12, 1990

[51] Int. Cl.⁵ .............................................. B65D 41/04
[52] U.S. Cl. ..................................... 215/271; 215/230; 206/459; 206/524.8; 264/296; 264/320
[58] Field of Search ............... 215/271, 276, 230, 260, 215/256; 206/459, 524.8; 264/296, 320

[56] References Cited

U.S. PATENT DOCUMENTS

| | | |
|---|---|---|
| 2,194,004 | 3/1940 | Bukelt . |
| 3,144,154 | 8/1964 | Puse et al. ........................... 215/260 |
| 3,160,302 | 12/1964 | Chopin . |
| 3,448,881 | 6/1969 | Zipper . |
| 3,622,028 | 11/1971 | Lohrer . |
| 3,629,901 | 12/1971 | Wolf . |
| 3,672,527 | 6/1972 | Bly . |
| 3,720,979 | 3/1973 | Krawagna . |
| 3,888,378 | 6/1975 | Gerk . |
| 4,027,776 | 6/1977 | Douglas . |
| 4,051,972 | 10/1977 | Botkin ................................. 215/260 |
| 4,093,094 | 6/1978 | Smalley et al. ..................... 215/276 |
| 4,121,729 | 10/1978 | Husum ................................. 215/276 |
| 4,381,061 | 4/1983 | Cerny et al. . |
| 4,616,761 | 10/1986 | Nolan .................................. 215/271 |
| 4,678,082 | 7/1987 | Fillmore ............................. 206/459 |
| 4,799,598 | 1/1989 | McFadyen ......................... 215/260 |
| 4,925,617 | 5/1990 | Thompson ......................... 264/291 |

Primary Examiner—Stephen Marcus
Assistant Examiner—Stephen K. Cronin
Attorney, Agent, or Firm—Lockwood, Alex, FitzGibbon & Cummings

[57] ABSTRACT

This relates to the formation of a vacuum indicating button in a molded plastic closure. The button is formed by cold working which results in the flow of plastic material from a central portion of the end panel towards the center of the central portion and the automatic formation of an upwardly projecting generally curved button. In all forms the button is formed by cold working of the plastic. The button may be formed by coining between two opposed tools, or the button may be formed by cold working only the top side of the central portion of the end panel by such methods as including spinning, mechanical peening and shot peening. In the case of coining, the button may be formed either by a single annular ring of cold worked, oriented, reduced thickness material or by a plurality of such rings.

20 Claims, 2 Drawing Sheets

PLASTIC CLOSURE WITH SAFETY BUTTON AND METHOD OF FORMING SAME

This invention relates in general to new and useful improvements in closures, and more specifically to a plastic closure having a vacuum indicating button formed in a central portion of an end panel thereof to indicate that a vacuum is maintained in a package. Such a button is normally molded in the forming of the closure. However, such a molded button does not necessarily have the desired force requirements for effecting the inversion of the button when a vacuum is drawn within the package.

In accordance with this invention, the button is formed by cold working the material in the button region of a injection molded closure by one of a number of processes.

By controlling the geometry, finish and lubrication of the forming tooling, the material from the worked region is made to flow in such a manner that the center of the circular panel in question is forced to bulge upward into a convex shaped button.

Forming at room temperature sets up elastic compressive residual stresses in the button region of the closure. It has been found that this stress state is beneficial in enhancing button functions, and/or lowering the force needed to make the button function as a result of the vacuum drawn within the package.

The several processes for forming the button include coining causing a thickness reduction in the form of a ring of material at the periphery of the center panel, or a series of reductions over the entire surface of the center panel. Alternately, the deformation can be caused by peening, rolling or spinning processes to obtain the desired stress state.

With the above and other objects in view that will hereinafter appear, the nature of the invention will be more clearly understood by reference to the following detailed description, the appended claims, and the several views illustrated in the accompanying drawing.

Figure 1:
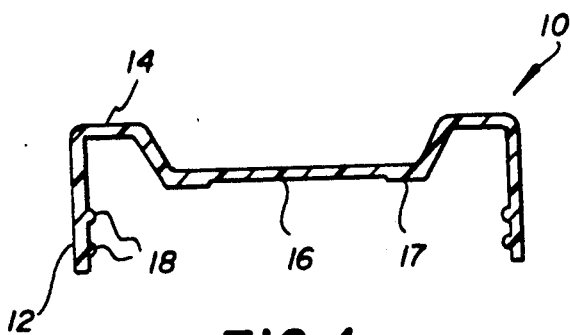
FIG. 1 is a vertical sectional view taken through a plastic closure which is to be provided with a button in accordance with this invention, the plastic closure being shown in its as molded state.
Figure 1A:
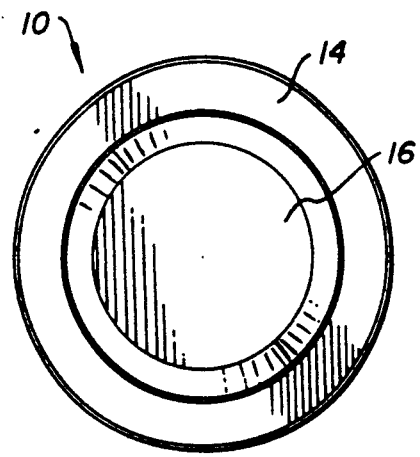
FIG. 1A is a top plan view of the closure of FIG. 1.

Referring now to the drawings in detail, it will be seen that there is illustrated in FIG. 1 a typical closure, generally identified by the numeral 10, which is modified in accordance with this invention to include a vacuum indicating button. The closure 10 includes a cylindrical skirt 12 and an end panel 14. The end panel 14 is preferably provided with a recessed, flat central portion 16 from which the button is formed. The peripheral part of the central portion 16 is preferrably thickened as at 17. In the illustrated embodiment of the enclosure 10, the skirt 12 is provided with internal threads 18 to facilitate the screw threading of the closure 10 on to a container neck finish.

It is pointed out here that the manner in which the closure is attached to a container neck finish is immaterial and may be varied. In a like manner, while it is preferred that the central portion 16 of the end panel 14 be recessed so that the resultant button will not project above the top of the closure, the end panel or end wall 14 could be entirely flat.

In accordance with a preferred embodiment of the invention, there is provided cooperating tooling 20, 22 which include opposed coining surfaces 24, 26, respectively. The tooling is preferably utilized at room temperature and engages the thickened part 17 of the central portion 16 of the end panel 14 from opposite surfaces thereof. The tooling 20, 22 serves to effect cold flow of the engaged portions of the central portion 16 radially inwardly to effect a thickening of the central part of the central panel 16 which results in a displacement of that central part to form an upstanding button 28. It will be seen that the illustrated button 28 is surrounded by an annular area 30 which has been thinned. The thinned material of the area 30 is flatened from opposite surfaces of the circular part 17 of the end panel 14 and is oriented. As a result, the area 30 has set up therein an elastic compressive residual stress in the button region of the closure. This stress state is beneficial in enhancing button function, and/or lowering the force, produced by the vacuum within a container needed to make the button function.

As is broadly described above, the orientation of the area 30 may be varied by varying the configuration and relationship of the surfaces 24, 26, by lubricating the surfaces 24, 26 and by controlling the spacing between the surfaces 24, 26 at the end of the operation of the tooling.

Figure 3:
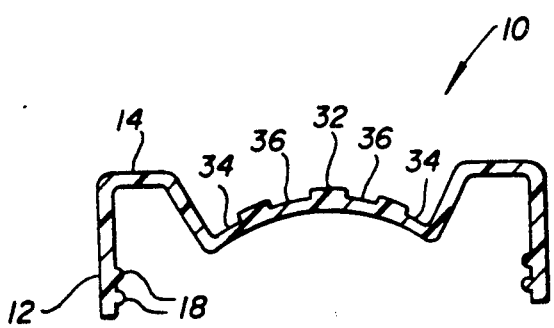
FIG. 3 is another sectional view similar to FIG. 2 and shows a modified form of button which is formed by coining two rings as opposed to the one ring of FIG. 2.

Although the tool 20 is provided with a single ring defining the coining surface 24, it is to be understood that there may be two or more such rings of coining surfaces. When there are two rings of coining surfaces 24, 26, a modified form of button 32 is formed as is best shown in FIG. 3. The button 32 will be defined by two oriented rings 34, 36 of material of reduced thickness.

Figure 4:
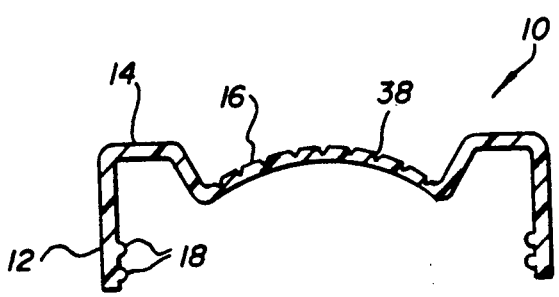
FIG. 4 is a vertical sectional view showing another form of button construction wherein the button forming central panel portion is cold worked at the top thereof by spinning or peening.
Figure 3A:
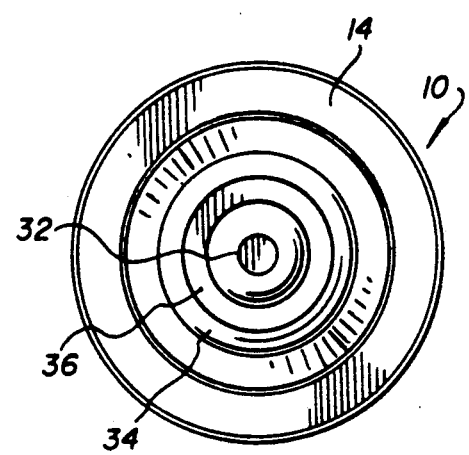
FIG. 3A is a top plan view of the closure of FIG. 3.
Figure 5:
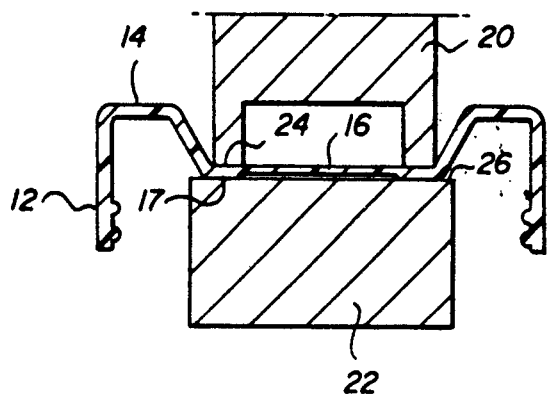
FIG. 5 is a vertical sectional view showing a typical type of tooling for effecting the coining of the closure of FIG. 1 to form the closure of FIG. 2.
Figure 4A:
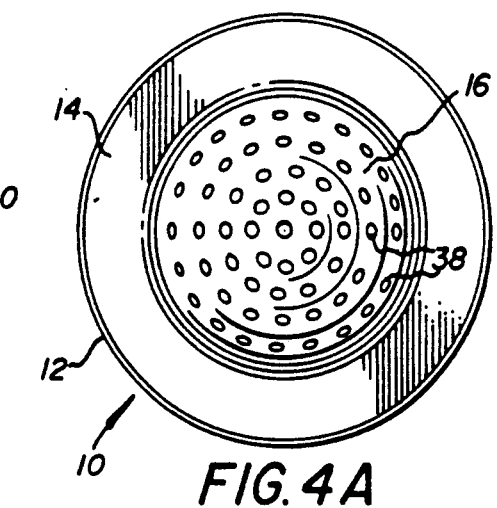
FIG. 4A is a top plan view of the closure of FIG. 4.

Reference is now made to FIG. 4 wherein there is illustrated another modified form of the closure 10 wherein the central portion 16 of the end panel 14 is worked only on the top side thereof so as to effect localized thickening of the worked upon central portion 16 to effect an upward arching and orientation of the central portion 16 to form a button 38. As will be illustrated hereinafter, the working of the top side only of the central portion 16 may be effected in a number of ways including spinning, mechanical peening and shot peening.

Figure 2:
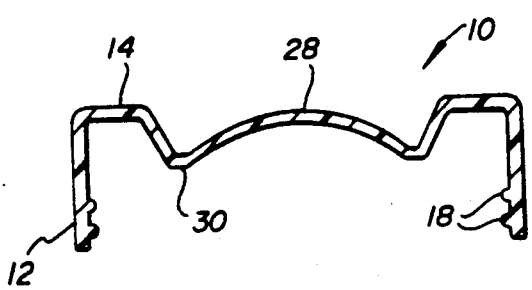
FIG. 2 is a vertical sectional view taken through the closure of FIG. 1 after being cold worked by coining to form the desired button in a central panel portion of the closure.
Figure 2A:
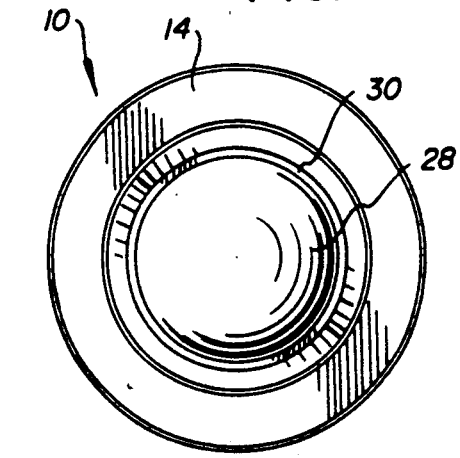
FIG. 2A is a top plan view of the closure of FIG. 2.
Figure 6:
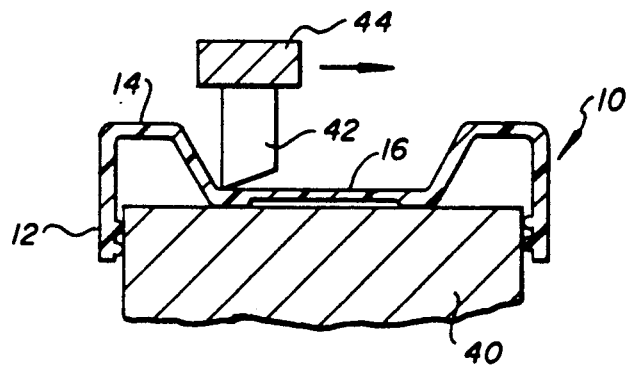
FIG. 6 is a sectional view showing the as molded closure of FIG. 1 having the top side of the central portion of the end panel cold worked in a spinning operation.

Referring now to FIG. 6, it will be seen that there is illustrated suitable tooling for cold working of the top side of the central portion 16 to effect the formation of the button 28 as shown in FIG. 2. The tooling includes a suitable holder 40 for receiving and rotating the closure 10 while the periphery of the top side of the central portion 16 is engaged by a suitable spinning tool 42 carried by a movable carrier 44. The tool 42 may also be used so as to form a plurality of concentric grooves or spiral grooves in the top side of the central portion 16 to form the button of FIG. 4.

Figure 7:
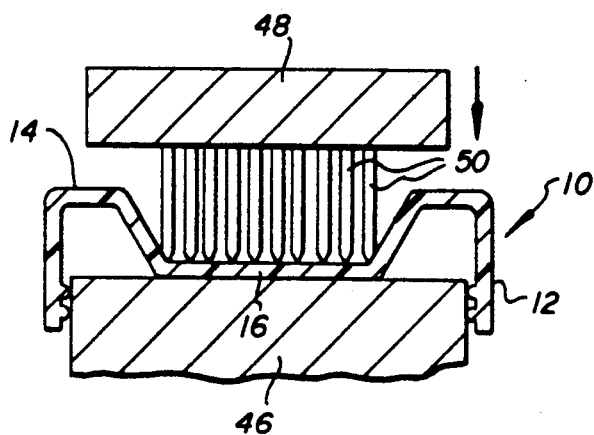
FIG. 7 is another sectional view similar to FIG. 5 and shows the tooling required for the mechanical peening of the top side of the central portion of the end panel.

In FIG. 7 there is illustrated suitable tooling for effecting the mechanical peening of the top side of the central portion 16. This tooling includes a holder 46 for receiving the closure 10 and supporting the closure. The tooling also includes a support 48 having a plurality of peening pins 50 projecting from the lower surface thereof. Under varying conditions the points of the pins may be in a plane, as shown, or in an arcuate arrangement, for engaging and cold working the top side of the central portion 16. The net result is a closure having the general appearance of the closure 10 of FIG. 4.

Figure 8:
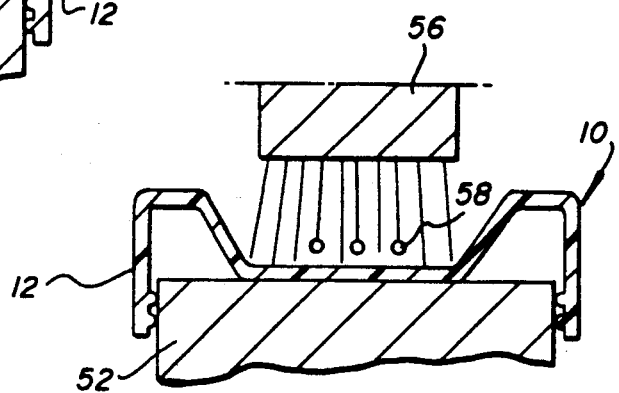
FIG. 8 is another sectional view through the as molded closure of FIG. 1 with the top side of the central portion of the end panel being cold worked by shot peening.

Finally, there is illustrated in FIG. 8 suitable tooling for effecting the shot peening of the top side of the central portion 16 to effect a cold working thereof. The tooling is schematically illustrated as including a support 52 for receiving therein the closure 10 in an inverted state. Associated with the holder 52 is a blow tube 56 for directing shot or other particulate 58 against the top side of the central portion 16.

It is to be understood that the toolings of FIGS. 7 and 8 may form the closure 10 of FIG. 4 including the button 38 thereof.

As is generally pointed out above, it is to be understood that the formation of the button and the resistance of the button to deflection can be controlled by varying the depth and spacing of the indentations in the top side of the central portion 16. This will, in turn, control the orientation of the worked plastic as well as the strength and elastic modulus of the plastic.

Although only several arrangements of button formation by cold working and several methods of effecting the formation of the buttons in accordance with this invention have been specifically illustrated and described herein, it is to be understood that minor variations may be made in the resultant closures, the tooling with which the closure is formed and the method of utilizing the tooling as is broadly described in the appended claims.

I claim:

1. A plastic closure for use in a vacuum packed package, said closure including an end panel having a vacuum indicating button projecting from said end panel, said closure being improved by said button structurally including a cold work reduced portion crowding plastic material into a central area to define said projecting button.

2. A plastic closure according to claim 1 wherein said cold work reduced portion is structurally coined to orient the plastic and obtain a greater strength per unit cross section and a higher elastic modulus than the remainder of said plastic closure.

3. A plastic closure according to claim 1 wherein said cold work reduced portion is structurally reduced from both an upper surface of said end panel and a lower surface of said end panel.

4. A plastic closure according to claim 1 wherein said cold work reduced portion is annular in outline.

5. A plastic closure according to claim 4 wherein there are a plurality of said annular cold work reduced areas.

6. A plastic closure according to claim 1 wherein said cold work reduced portion has the appearance of being formed by peening.

7. A plastic closure according to claim 1 wherein said cold work reduced portion has the appearance of being formed by spinning.

8. A plastic closure according to claim 1 wherein that portion of said end panel from which said button is formed is initially flat.

9. A method of forming a vacuum indicating button on an end panel of a plastic closure, said method comprising the steps of providing a plastic closure having an end panel, and cold working a central portion of said end panel to thin said end panel central portion and to flow plastic material radially inwardly in a circular pattern to effect orientation and axial offsetting of said circular central portion to form a projecting button.

10. The method of claim 9 wherein said cold working is in annular pattern and is a coining operation.

11. The method of claim 9 wherein said cold working is in annular pattern and is a coining operation to define a thinned ring generally surrounding said button.

12. A method according to claim 9 wherein said cold working is applied to opposite surfaces of said end panel.

13. A method according to claim 10 wherein said cold working is applied to opposite surfaces of said end panel.

14. A method according to claim 9 wherein said cold working is applied to one surface only of said end panel.

15. The method of claim 9 wherein said cold working is in the form of spinning.

16. The method of claim 9 wherein said cold working is in the form of spinning applied to one surface only of said end panel.

17. The method of claim 9 wherein said cold working is in the form of peening.

18. The method of claim 9 wherein said cold working is in the form of peening applied to one surface only of said end panel.

19. The method of claim 17 wherein said peening is mechanical peening.

20. The method of claim 17 wherein said peening is shot peening.

* * * * *